United States Patent Office 3,118,747
Patented Jan. 21, 1964

3,118,747
PROCESS FOR PURIFYING GASEOUS
FORMALDEHYDE
Franco Codignola, Christopher G. A. Clayton, Jakob Ackermann, and Gerhard K. E. Vogel, Milan, Italy, assignors to Società Italiana Resine, Milan, Italy
No Drawing. Filed Dec. 30, 1960, Ser. No. 79,556
Claims priority, application Italy Oct. 29, 1960
2 Claims. (Cl. 55—33)

This invention relates to a novel method of preparing pure substantially anhydrous formaldehyde monomer suitable for production of polyoxymethylenes of high molecular weight.

It is known that raw gaseous formaldehyde, such as is obtained by pyrolysis of commercial paraformaldehyde can be purified by conveying it over heat exchangers which cool it down to suitable temperatures. This results in partial polymerization which retains in the polymer formed any impurities contained in the raw gaseous formaldehyde, which would disturb polymerization of the monomeric formaldehyde and would lead to the formation of polyoxymethylenes of low molecular weight of no commercial value.

Gaseous formaldehyde monomer freed from impurities as above is suitable for use in manufacturing polyoxymethylenes of high molecular weight (H. Staudinger, Die Chemie der hochmolekularen organischen Verbindunger, Berlin, Springer (1932), page 280, and E. Ufer, Journ. prakt. Chem., 1926, 113, 105).

A method based upon the above principles is disclosed by U.S. Patent 2,824,051, dated February 18, 1958, E. I. du Pont de Nemours & Co. Inc.

However, this method suffers from considerable drawbacks both from a technological and operational point of view, for it entails a considerable loss of formaldehyde, while the need for continuous mechanical cleaning of the heat exchangers makes operation troublesome.

Later purification methods employ washing liquids, such as dimethyl ether of tetramethylene glycol which succeeds in purifying gaseous formaldehyde at relatively high temperature (U.S. Patent 2,780,652, dated February 5, 1957, E. I. du Pont de Nemours & Co. Inc.) or cyclohexanolhemiformal which acts at low temperature (Belgian Patent No. 566,283 of March 31, 1958, E. I. du Pont de Nemours & Co. Inc.)

The latter methods though being technically suitable for purifying formaldehyde for use in manufacturing polyoxymethylenes of high molecular weight, are objectionable on the ground of a high cost of the starting product employed which on account of losses during regeneration results in high cost of the final polymer product obtained.

It is an object of this invention to provide a method of easily and inexpensively removing impurities from raw gaseous formaldehyde such as is obtained by pyrolysis of commercial paraformaldehyde. The impurities contained in raw formaldehyde are water, methyl alcohol, formic acid as well as their mutual reaction products and products of reaction of said impurities with formaldehyde itself.

The method is based upon adsorption of impurities from raw gaseous formaldehyde through contact with a solid adsorbent of an acidic character, which is substantially anhydrous and non-volatile in absorption conditions.

It was surprisingly found that formaldehyde does not undergo any chemical reaction when contacted by the acidic adsorbent according to this invention, though formaldehyde is known to be subject of the so-called Cannizzaro reactions in the presence of acids (H. Staudinger et al., Ann. 1929, 474, 254–5).

Formaldehyde obtained by the improved method contains less than 0.3% impurities and is more particularly suitable for the manufacture of polyoxymethylenes of high molecular weight.

Where necessary the impurity content can be reduced to less than 0.1%.

The improved method can be practised in any of the three following manners, alternatively:

(1) Raw gaseous formaldehyde is conveyed through pipes containing the adsorbent according to the fixed bed principle;

(2) Raw gaseous formaldehyde and adsorbent are conveyed in counter-current according to the moving bed principle;

(3) Raw gaseous formaldehyde is conveyed through the adsorbent maintained in a turbulent suspension by the gaseous formaldehyde flow itself along the fluidized bed principle.

Temperatures in the adsorption stage range between $-20°$ C. and $+150°$ C., operation being preferably carried out between $+80°$ C. and $+125°$ C. The method is more particularly useful in connection with raw gaseous formaldehyde of a minimum 90% purity.

Suitable adsorbents according to this invention are solid substances of an acidic character which are substantially anhydrous and non volatile, chemically and physically inert in respect of formaldehyde and possess a marked affinity towards impurities contained in formaldehyde and can be regenerated by a stripping process by means of inert gases.

The adsorbents can be prepared by adsorbing a non-volatile acid, such as polylactic or polyphosphoric acid by an inert support, such as kieselguhr, pumice, fuller's earth or bentonite.

Ion-exchange resins, such as sulphonated polystyrene or polyphenol resins or a cross-linked polyacrylic acid are further adsorbents which may be used for the purposes of this invention.

The following examples will further illustrate the invention, but should not be taken as limitations.

*Example 1*

A commercial ion-exchange resin consisting of cross-linked polyacrylic acid, such as Amberlite IRC–50x6 is treated twice with 4 N hydrochloric acid and repeatedly washed with distilled water to thoroughly remove chlorine ions. The still moist resin is dried in vacuum during 20 hours at 85° C. and is thereupon sieved so that the diameter of all particles ranges between 0.5 and 1 mm.

The resin treated as above is filled into a glass tube 4 cm. in diameter and 50 cm. in length.

The tube is provided with a heating jacket. The tube is heated to 117° C. by circulating oil in the jacket, while air dried on silica gel is caused to flow through the tube. An oxygen-free nitrogen stream is then substituted for the air stream in order to remove any trace of oxygen from the tube.

Admission of raw gaseous formaldehyde which has been preheated to 130° C. is then started at a rate of 1.5 liters/minute. The raw formaldehyde is obtained by pyrolysis of commercial paraformaldehyde at 175° C. in dioctylphthalate. Raw formaldehyde titrates 96%, impurities being by ¾ water.

The formaldehyde gas issuing at the top of the purifying column is condensed in two consecutive traps operating in series cooled by means of an acetone-solid carbon dioxide mixture.

Supply of raw formaldehyde is stopped after 20 minutes; the traps contian about 24 gr. liquid formaldehyde in the form of a highly mobile clear liquid; purity was of the order of 99.9%.

Regeneration of the adsorbent in the column is effected by a vigorous nitrogen stream supplied at a rate of 10 liters/minute, the temperature in the column being raised to 130° C.

After 30 minutes impurities were thoroughly removed from the adsorbent, the column being ready for a fresh cycle.

*Example 2*

Formaldehyde issuing from the column according to Example 1 is introduced from the bottom into a similar column filled with identical adsorbent, instead of being condensed as described above. In this case the temperature amounts to 92–96° C.

All other conditions are identical to those of Example 1. The formaldehyde issuing from the second column is of 99.97% purity. Regeneration of the ion-exchange resin is effected as in Example 1.

*Example 3*

Purification of anhydrous gaseous formaldehyde obtained according to Example 1 is effected in a moving bed apparatus in counter-current to the ion-exchange resin. The apparatus comprises an adsorbing column 5 cm. in bore and 50 cm. long and a regenerating column 8 cm. in bore and 120 cm. long.

While raw gaseous formaldehyde preheated at 130° C. is supplied at a rate of 4.5 liters/minute, the ion-exchange resin flows in counter-current to the gases in the adsorption column towards and into a regeneration column. Monomeric formaldehyde which issues at the top of the adsorption column has a purity of at least 99.8% and is condensed in accordance with Example 1 or conveyed to a polymerising apparatus direct. The adsorbent flowing into the regeneration column, which retains the impurities from the raw formaldehyde is regenerated in the column by maintaining the latter at 135° C. and blowing in coutner-current nitrogen at a rate of 8 liters/min.

The regenerated adsorbent is returned from the bottom of the regeneration column to the top of the adsorption column by means of a nitrogen stream or other means. The return pipe for the regenerated adsorbent is maintained at a temperature ranging between 130° and 132° C.

*Example 4*

An adsorbent material in accordance with Example 1 is admitted into a multi-stage fluidized bed apparatus. This apparatus comprises an adsorption column and a regeneration column. However, as distinct from Example 2 the adsorbent is maintained in a turbulent suspension both in the adsorption and regeneration columns.

The adsorption column to regeneration column ratio is 15 to 40 stages.

Raw gaseous formaldehyde pre-heated at 135° C. is supplied at a rate of 11 liters/minute to the bottom of the adsorption column which is 3 cm. in bore and 75 cm. in length.

The regeneration column is 4.5 cm. in bore and 150 cm. long. Regeneration is effected at 140° C. by blowing dry nitrogen at a rate of 20 liters/min.

The regenerated adsorbent is recirculated at a rate of 1 gram/minute by the raw gaseous formaldehyde stream supplied through a pipe which is maintained at 135° C.

Formaldehyde obtained at the top of the adsorption column can be condensed in accordance with Example 1 or conveyed to polymerization direct. Its purity is of the order of 99.8%.

What we claim is:

1. A method of purifying monomeric formaldehyde containing impurities comprising water, methyl alcohol, formic acid and mutual reaction products thereof, said method comprising contacting the impure monomeric formaldehyde in a gaseous condition with an adsorbent selected from the group consisting of polylactic acid, polyphosphoric acid, sulfonated polystyrene resin, sulfonated phenolic resin and cross-linked polyacrylic acid at a temperature selected in the range of −20° C. to +150° C., and regenerating the exhausted adsorbent by stripping by means of an inert gas at a temperature higher than that selected for adsorption.

2. A method of purifying monomeric formaldehyde containing impurities comprising water, methyl alcohol, formic acid and mutual reaction products therof, said method comprising; contacting the impure monomeric formaldehyde in a gaseous condition with a solid adsorbent selected from the group consisting of polylactic acid, polyphosphoric acid, sulfonated polystyrene resin, sulfonated phenolic resin and cross-linked polyacrylic acid at a temperature selected in the range of −20° C. to +150° C., and regenerating the exhausted adsorbent by stripping by means of an inert gas.

References Cited in the file of this patent
UNITED STATES PATENTS
2,875,606    Robinson _____ Mar. 3, 1959